Patented Dec. 12, 1950

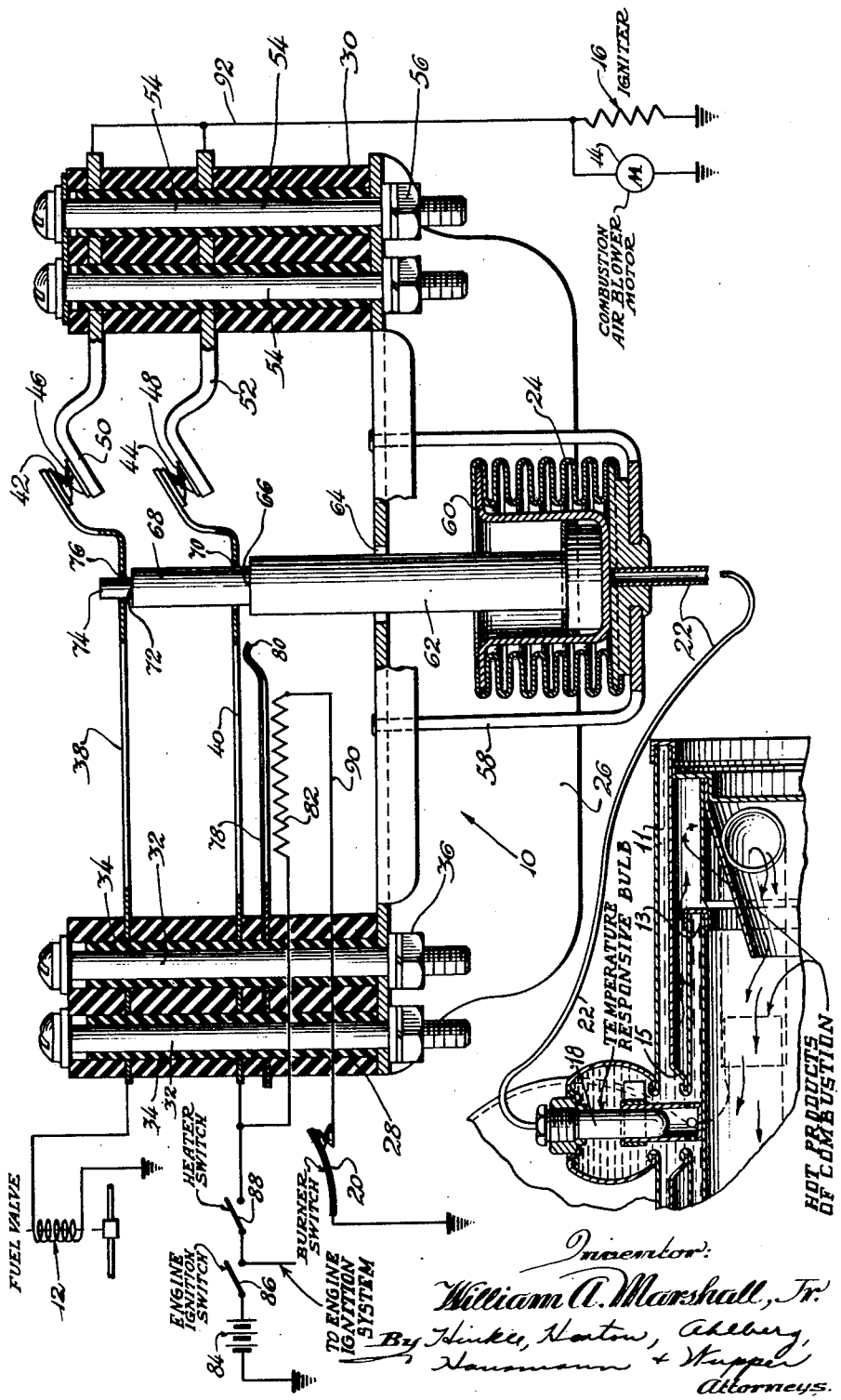

2,533,486

UNITED STATES PATENT OFFICE 2,533,486

HEATER SYSTEM

William A. Marshall, Jr., Indianapolis, Ind., assignor to Stewart-Warner Corporation, Chicago, Ill., a corporation of Virginia Application March 14, 1947, Serial No. 734,786

6 Claims. (Cl. 123—142.5)

The present invention relates to heaters and more particularly to a control system for operating a combustion heater of what I prefer to call the "booster" type.

In my earlier patent application entitled "Heaters" filed May 4, 1946, Serial No. 667,421, and in the still earlier application of John H. Leslie, II, and William A. Marshall, Jr., entitled "Water Heaters" filed December 22, 1945, Serial No. 636,743, will be found descriptions of a booster type heater. In general, a heater of this type is used in an automotive vehicle having an engine of the liquid cooled type in conjunction with a hot water heater which serves to exchange heat from the cooling medium of the engine to the air within the passenger compartment. Water heaters of this type are well known but have a serious disadvantage in that there is no heat output for a considerable period after starting a cold engine of the vehicle and for a considerable period thereafter the heat output is low because of the slow rise in the temperature of the engine cooling medium.

A booster heater is adapted to be inserted in the cooling medium circuit which leads from the engine to the hot water heater and serves the purpose of almost instantaneously raising the water passing from the engine to the hot water heater to a temperature level sufficient to give good heat output from the hot water heater. A booster heater also, of course, materially shortens the warm-up period of the engine. Subsequently, after all of the water or other liquid cooling medium in the engine has been brought up to a certain predetermined temperature level the control system should automatically shut off the booster until it is subsequently required at the beginning of a new cycle. A booster heater per se is not the subject of the present application, this invention being directed to a system for controlling and operating such a heater.

It is an object of the present invention to provide a novel low cost control system for a booster type heater.

Another object is to provide an improved control system at low cost which will fulfill all of the operating and safety requirements of such a heater.

Still another object of the present invention is to provide a control system which will turn on the fuel to the heater, supply the heater with combustion air, and ignite the combustible mixture in the heater so as to place the heater in operation. Additionally, the control system cycles the heater on and off between prechosen temperature limits and finally turns the heater off when the temperature of the water within the heater rises above the upper limit. This system also prevents the heater from restarting upon a momentary drop in water temperature after it has once shut off and further prevents any attempt of the heater to restart when conditions are such as to make starting difficult. Also, the control system is extremely simple in nature and completely automatic so that it can be turned on at the beginning of a cold weather season and thereafter the booster heater will operate whenever its operation is desirable without further attention.

Other objects and advantages will become apparent from the following description of a preferred embodiment of my invention which is illustrated in the accompanying drawing.

The single figure in the drawing shows a control arrangement for a booster type heater. The drawing is partly structural and partly diagrammatic.

Referring to the drawing, it will be seen that the device therein shown comprises a controller indicated generally by the numeral 10 which operates several elements or mechanisms in proper sequence. These elements, shown diagrammatically, are an on-off fuel valve 12 which is of the magnetic type and is adapted to permit the flow of fuel therethrough from a source to the heater whenever the electric circuit to the fuel valve is energized. De-energizing the fuel valve automatically turns off the fuel supply and therefore interrupts combustion. A booster heater of the type disclosed in the previously referred to patent applications Serial No. 667,421 and Serial No. 636,743 has annular water jackets 11 and 13 radially spaced from each other to provide an annular passage for hot products of combustion between the jackets. These jackets are interconnected at one or more places, as indicated at 15 in the drawing, to permit flow of water between the jackets. The inlet to these jackets communicates with the water in the engine cooling system, and the outlet is connected to a heat exchanger in the compartment of the vehicle upon which the heater is being used. These connections are of conventional construction and, therefore, a description of the same is thought to be unnecessary. Hot products of combustion flow through the cylindrical space within the inner jacket and into the annular space between the jackets as indicated by the arrows in the drawings, and the heater has an electrically driven blower for supplying combustion air to the burner and an electric igniter of the hot wire type for igniting the mixture of fuel and air within the heater. At 14 I have shown an electric motor which drives such a combustion air blower while the igniter for the heater is indicated at 16.

The principal purpose of the controller and control system which forms the subject matter of the present invention is to operate the fuel valve 12, the igniter 16 and the motor 14 in proper sequence. This is accomplished by a temperature sensitive bulb 18 disposed within the hot water space of the booster heater and a bimetal normally closed thermostatic switch 20 which is sensitive to the temperature of the heater burner. The temperature sensitive bulb 18 is preferably disposed in the portion of the heater interconnecting the two water jackets as shown in the drawing and the aforementioned application for patents, so that the bulb is sensitive to the temperature of the water in both jackets. One example of a burner switch 20 suitable for use in the present system is shown and described in the patent application of Vernon Tramontini for "Heater Burner" filed August 17, 1946, Serial No. 691,190, now Patent Number 2,481,631, September 13, 1949.

In general, it may be said that the bimetal switch 20 is so arranged that it is normally closed at ordinary temperatures but that it will open approximately ten seconds after combustion begins in the heater. Since a hot wire type igniter is used, combustion will start ordinarily about ten seconds after the heater is turned on because it takes about that long for the igniter to heat to ignition temperature. The switch 20, therefore, will open approximately twenty seconds after the heater is turned on although considerable latitude in adjustment of this time interval is permissible. Soon after combustion in the burner is extinguished, switch 20 recloses.

The bulb 18 is filled with a fluid which expands or changes to the vapor state at elevated temperatures so as to raise the pressure within the bulb. This pressure change communicates through a capillary tube 22 with an expansible bellows 24, thus causing it to elongate upon an increase in temperature at the bulb 18.

The controller proper, indicated by the numeral 10, comprises a base plate 26 adapted to support a stack of insulating blocks 28 and 30 at either end. The blocks 28 at the left-hand end are held in place by a pair of screws 32 which pass downwardly through the stack and through insulating tubes 34 and are secured to the base 26 by nuts 36. The assembly of blocks 28 supports an upper switch blade 38 and a lower switch blade 40 of the spring type equipped at their free ends with contacts 42 and 44, respectively. The contacts 42 and 44 co-operate with mating contacts 46 and 48 which are carried at the ends of metal strips 50 and 52, respectively, the latter strips being arranged generally parallel to each other and supported in the stack of insulating blocks 30 at the righthand end of the device. The insulating blocks 30 space the bars or strips 50 and 52 and the assembly is clamped in place by screws 54 which pass downwardly through the blocks 30 and are secured to the base plate 26 by nuts 56.

Normally, the blades 38 and 40 in their free condition bring the contacts 42 and 44, respectively, against the contacts 46 and 48. In their free condition, therefore, the flexible blade 38 is electrically connected to the fixed strip 50 while the flexible blade 40 is similarly connected to the fixed strip 52.

The expansible bellows element 24 previously referred to is supported in a U-shaped hanger 58 so as to be vertically arranged in a position beneath the base plate 26. The bellows is so connected that fluid from the bulb 18 passing through the capillary tube 22 exerts a pressure upon its interior and causes it to elongate. The upper end of the bellows is sealed to the edge of a cup 60 which supports a pin or stem 62 of insulating material which passes upwardly through an opening 64 in the base. Near its upper end the stem 62 is stepped down in diameter so as to provide a shoulder 66 beneath the blade 40, a smaller stem 68 which extends upwardly beyond the shoulder 66 through an opening 70 in the lower blade 40, a second shoulder 72 in a position beneath the blade 38 and a small stem 74 which extends beyond the shoulder 72 and passes through an opening 76 in the upper blade 38.

The spacing between the shoulder 72 and the blade 38 is less than the similar spacing between the shoulder 66 and the blade 40 so that as the stem 62 rises upon an increase in temperature at the bulb 18, switch blade 38 will first be moved upwardly so as to separate contacts 42 and 46 while subsequently upon a further increase in temperature, blade 40 will be lifted to separate contacts 44 and 48. As an example, the control device may be considered as so adjusted that contacts 42 and 46 will separate when the bulb 18 is at a temperature of approximately 140 degrees F. whereas contacts 44 and 48 will be separated at a temperature of about 160 degrees F.

A bimetal strip 78 is disposed in parallel relationship beneath the flexible switch blade 40 and has one end anchored in the stack of insulating blocks 28 in the same manner as is used to anchor the blades 38 and 40. This bimetal blade 78 has an upturned portion 80 at its free outer end which is adapted to lift the blade 40 so as to separate contacts 44 and 48 whenever the bimetal blade 78 flexes upwardly a predetermined amount. The bimetal blade 78 is so oriented that it deflects upwardly upon an increase in temperature.

An electric resistance heater is indicated at 82 and is disposed in a position beneath the blade 78 or, if preferred, it may be wrapped around this blade so that it is in heat exchange relation thereto. Thus, energization of the resistance element 82 will raise the temperature of the blade 78 and cause it to deflect upwardly at its free end. The characteristics of the blade 78 and of the heating element 82 are such that the blade 78 will have deflected sufficiently to separate the contacts 44 and 48 after electric power has been supplied to the resistance element 82 for approximately one minute. If the heater 82 is energized for a lesser interval of time and then is de-energized, the free end 80 of the blade 78 will move upwardly and then downwardly again without separating the contacts 44 and 48.

The electrical connections to the device are as follows. The automobile battery, indicated by the numeral 84, is grounded at one side, the other side being connected to the automobile ignition switch 86 which in turn is connected through a heater switch 88 to the blade 40 and to one end of the resistance element 82. Thus, opening the heater switch 88 or turning off the ignition circuit for the automobile engine will result in de-energizing the entire booster heater circuit. The opposite end of the resistance element 82 is connected by a wire 90 through the bimetal burner switch 20 to ground. It is apparent, therefore, that the heating element 82 is energized whenever switches 86 and 88 are closed, provided that burner switch 20 is also closed.

So long as contacts 44 and 48 remain engaged and switch 86 and 88 are closed, electric power will flow through the blade 52 to a wire 92 which is connected to switch blade 50 and also to the igniter 16 and motor 14, the other sides of the latter two elements being grounded. The igniter and blower motor, therefore, are energized so long as contacts 44 and 48 are engaged, providing, of course, switches 86 and 88 are closed.

The fuel valve 12 receives its current supply by way of switch blade 38, contacts 42 and 46 and switch blade 50 which, as has been previously mentioned, is connected with the wire 92.

Assuming that the automobile engine is cold and that the heater switch 88 is closed to condition the system for operation but that ignition switch 86 is open, it is apparent that no electrical energy reaches the heater circuit. If, now, the operator desires to start the automobile engine and therefore closes the ignition switch 86 to accomplish this purpose, electric power will be supplied to the heating element 82, the circuit of which is completed by way of the normally closed bimetallic burner switch 20. At the same time current passes by way of normally closed contacts 44 and 48 to the line 92, thereby energizing the hot wire igniter 16 and the combustion air blower motor 14. Simultaneously, current flows by way of contacts 46 and 42 to the fuel valve 12. Thus, fuel is delivered to the heater, the igniter 16 starts heating, and the combustion air blower motor 14 starts delivering combustion air to the burner. Under these conditions, the igniter 16 will reach ignition temperature and combustion will start in approximately ten seconds. In an additional ten seconds the temperature of the burner will increase sufficiently to open the bimetallic switch 20 which is sensitive to burner temperature, thereby de-energizing the resistance heater 82. During this time interval bimetal blade 78 will not have deflected sufficiently to separate contacts 44 and 48.

As combustion continues, the temperature of the water circulating through the automobile engine rapidly increases until the water at the bulb 18 reaches approximately 140 degrees. At this point the bellows 24 will have elongated sufficiently to raise the stem 62 enough to separate contacts 42 and 46. As soon as the circuit through these contacts is broken the fuel valve 12 will be deenergized, thereby extinguishing combustion. Since contacts 44 and 48 remain closed, however, the combustion air blower motor 14 and the igniter 16 remain energized. Because of this, any drop in temperature of the liquid within the heater below 140 degrees so as to reclose the circuit to the fuel valve 12 will cause additional fuel to be supplied to the burner so that it instantaneously restarts. In other words, although fuel is cut off at about 140 degrees, igniting conditions are maintained within the burner as would not be true if the igniter were permitted to cool during this time interval. The heater, therefore, will cycle on and off substantially instantaneously as the temperature falls or rises relative to 140 degrees until eventually the continued operation of the automobile engine raises the temperature of water to approximately 160 degrees at which time the contacts 44 and 48 will be separated by the action of the bellows 24 and stem 72.

Upon opening the circuit through contacts 44 and 48, the igniter 16 and the blower motor 14 will also be de-energized thereby permitting the burner to cool until the bimetallic flame detector switch 20 recloses. As soon as this occurs, the heating element 82 will be re-energized and within about a minute will have reached a temperature sufficient to deflect the bimetallic blade 78 upwardly to the point where contacts 44 and 48 cannot reclose even though the temperature of the water within the heating system drops below 160 degrees.

Because of this, subsequent fluctuations in water temperature will not cause the heater to recycle. Thus, the heater cannot restart until the automobile engine has been turned off long enough to permit the bimetal blade 78 to cool. Of course, if at any time the engine is stopped long enough to permit the water temperature to cool below 160 degrees, the switch blade 78 will also have cooled so that restarting the engine of the automobile automatically will turn on the motor 14 and igniter 16. If the temperature of the water has dropped below 140 degrees the fuel valve 12 will be opened so that the heater immediately restarts.

The system described above overcomes one of the objections to combustion heaters that use hot wire igniters for starting which is that if the igniter is turned off as soon as the burner starts and combustion is subsequently extinguished, attempts to restart the burner while it is still hot are sometimes futile. This is because re-energizing the igniter for a second start introduces a delay, since the igniter must have appreciable time to heat before ignition is possible. Meanwhile fuel flowing into the heater will be vaporized because of the high temperature of the burner. The result is that the fuel-air mixture in the vicinity of the igniter will frequently be too rich to burn by the time the igniter becomes sufficiently hot. This is because the heater must normally be so designed as to provide a suitable fuel-air ratio at the igniter when the burner is cold and vaporization of the fuel is slow. Stated another way, it frequently is true with a burner of this type that if it is so designed that it will quickly start when cold, for instance at temperatures well below zero, such a burner does not start well when hot unless the igniter is at igniting temperature when the fuel is first introduced.

The system described herein and forming the subject matter of the present invention by relatively simple means provides for starting the heater burner when cold by simultaneously supplying fuel, air and ignition. It also provides for cycling the fuel on and off at an intermediate water temperature without turning off the heater ignition system. Further, the system shuts off the fuel, air and ignition after the heated medium has reached a certain high predetermined temperature. Also, the system prevents attempts to restart the heater until a certain time interval has elapsed following the stopping of the engine of the vehicle with which the heater is associated. Additionally, since the blower motor 14 operates after the fuel has been turned off, all traces of fuel vapor and combustion products will be swept out of the combustion chamber and heat exchanger at the end of each cycle.

With certain types of burners used with heaters of this type, combustion may continue for a short interval after the fuel has been turned off since there is some accumulation of unburned fuel in the burner. The present system protects the heater against overheating in the event that a water stoppage or other condition causes rapid overheating of the heater and water within the heat exchanger. In other words, when the temperature of the water rises to approximately 140 degrees the fuel will be turned off. If, because of the residual fuel in the heater, the temperature continues to rise rapidly the blower will be turned off at 160 degrees with the result that combustion ceases for lack of combustion air even though there may be some fuel remaining in the burner.

Inasmuch as the electric power dissipated by the resistor 82 is extremely low and since this resistor will dissipate power only when the automobile engine and generator are operating—it is turned on and off with the engine ignition system—it will be seen that the heater switch 88 may be closed at the beginning of the cold weather season, following which the booster heater will operate automatically whenever such operation is desirable throughout cold weather. During this several month interval the booster heater will never operate unless its operation is desirable, but it will come into operation automatically whenever the automobile engine is started and the water temperature is low. Thus, the booster system always insures a high rate of heat output almost immediately from the hot water heater with which it is associated. Also, of course, it insures the cooling medium for the automobile engine being quickly heated to operating temperature, thereby shortening the "warm up" period for the engine. For this latter purpose the switch 88 may be left closed on a year around basis, if desired. It has been found that even in extremely cold weather a booster heater of the type shown in the referred to patent applications and controlled as described will not normally require more than about four to five minutes to raise the temperature of the water in the engine cooling system to operating level at which time the booster heater automatically shuts off. Because of this short period of operation it is no substantial additional burden on the automobile battery to energize the igniter continuously, particularly since the automobile generator is also operating during this same period.

Having described my invention, what I claim as new and useful and desire to secure by Letters Patent of the United States is:

1. A control system for a heater for preheating the cooling fluid of a liquid cooled internal combustion engine having a burner, a gas to liquid heat exchanger, an igniter of the hot wire type for the burner, an electrically driven blower for supplying combustion air to the burner and an electrically operated valve for turning on and off the supply of fuel to the burner, comprising a thermosensitive element responsive to the temperature of said liquid, a pair of electric switches operated by said thermosensitive element arranged so that one of said switches opens as the liquid temperature rises to a predetermined level while the other of said switches opens when the liquid temperature rises to a higher level, the second of said switches being connected in series with the first of said switches, a source of electric power connected by way of the first of said switches and then through the second of said switches to said fuel valve so that said fuel valve is open only when both of said switches are closed, said igniter and said motor for said blower being energized by way of the first switch so that said motor and said igniter operate whenever the first of said switches is closed, a second temperature responsive means adapted when heated for opening the first of said switches independently of the first mentioned temperature responsive means, an electric heating element for heating the second temperature responsive means when energized, and an electric circuit including said heating element, the last said electric circuit being independent of both of said switches, and a temperature responsive switch in the last said circuit adapted to de-energize said heating element when the burner attains a temperature sufficient to indicate the presence of combustion therein.

2. A control system for a heater for preheating the cooling fluid of a liquid cooled internal combustion engine having a burner, a gas to liquid heat exchanger, an igniter of the hot wire type for the burner, an electrically driven blower for supplying combustion air to the burner and an electrically operated valve for turning on and off the supply of fuel to the burner, comprising a thermosensitive element responsive to the temperature of said liquid, a pair of electric switches operated by said thermosensitive element arranged so that one of said switches opens as the liquid temperature rises to a predetermined level while the other of said switches opens when the temperature of said liquid rises to a higher level, a source of electric power and circuit means including said source and connected by way of both of said switches in series for energizing said fuel valve, circuit means including said source of electric power and the first switch means for energizing said motor and igniter, electrically heated temperature responsive means adapted for opening the first of said switches independently of the first mentioned temperature responsive means upon energization for a predetermined period, and an electric circuit including the heater of said electrically heated temperature responsive means and said source of electric power for energizing said electric heater from said source upon the establishment of conditions in said burner which indicate the absence of combustion therein.

3. A control system for a heater for preheating the cooling fluid of a liquid cooled internal combustion engine having a burner, a gas to liquid heat exchanger, an igniter of the hot wire type for the burner, electrically operated means for supplying combustion air to the burner, and electrically operated means for supplying fuel to said burner comprising a thermosensitive element responsive to the temperature of said liquid, first circuit means for energizing said fuel supply means from a source of electric power, said first circuit means including switch means adapted to be opened by said thermosensitive element at a predetermined temperature in said liquid, second circuit means for energizing said igniter and said combustion air supplying means from said source of electric power, switch means in the last said circuit for interrupting the last said circuit, the last said switch means being operated by said thermosensitive element at a higher temperature than the first said switch means, and time delay actuating means energized with both of said circuits and de-energized a predetermined period after establishment of combustion, said time delay means being adapted to interrupt both of said circuits when actuated.

4. A control system for a heater for preheating the cooling fluid of a liquid cooled internal combustion engine having a burner, a gas to liquid heat exchanger, an igniter of the hot wire type for the burner, electrically operated means for supplying combustion air to the burner and electrically operated means for supplying fuel to said burner, comprising a thermosensitive element responsive to the temperature of said liquid, first circuit means for energizing said fuel supply means from a source of electric power, said first circuit means including switch means adapted to be opened by said thermosensitive element at a predetermined temperature in said liquid, second circuit means for energizing said igniter and said combustion air supplying means from said source of electric power, switch means in the last said circuit for interrupting the same, the last said switch means being operated by said thermosensitive element at a higher temperature than the first said switch means, time delay actuating means energized with both of said circuits and adapted to interrupt both of the circuits when actuated for a predetermined period, and a circuit for said time delay actuating means, said circuit including means sensitive to combustion in said heater operable to open the same a predetermined period after establishment of combustion and to close the circuit a predetermined period after said last switch means has been opened by said thermosensitive elements.

5. A control system for a heater for preheating the cooling fluid of a liquid cooled internal combustion engine having a burner, a heat exchanger, an igniter of the hot wire type for the burner, electrically operated means for supplying combustion air to the burner and electrically operated means for supplying fuel to said burner, comprising a thermosensitive element responsive to the temperature of said liquid, first circuit means for energizing said fuel supplying means from a source of electric power, said first circuit means including switch means adapted to be opened by said thermosensitive element at a predetermined temperature in said liquid for closing the fuel valve, means for continuing operation of said igniter and blower after said fuel valve closes including a second circuit adapted to remain closed independently of said first circuit, switch means in the second circuit for interrupting the same, the last said switch means being operated by said thermosensitive element at a higher temperature than the first said switch means, thermosensitive means for simultaneously opening both said circuits independently of said first thermosensitive means, means for electrically heating said second thermosensitive means, and a circuit for said heating means adapted to be maintained closed throughout the period of operation of said engine after initial opening of said second circuit to prevent re-energization of said fuel supply means, igniter and combustion air supplying means until after operation of said engine is discontinued.

6. In a control mechanism of the class described, the combination comprising first and second fixed contacts, a first deflectable blade carrying a contact adapted to co-operate with the first fixed contact for closing a circuit through said control mechanism, a second blade adapted to be connected to a source of current, said second blade carrying a contact adapted to co-operate with said second fixed contact for closing a circuit through said control mechanism from said source of current, said blades normally biasing the contacts carried thereby to closed position with said fixed contacts, temperature responsive means for moving the first blade in advance of the second to open the circuit through the first blade prior to opening of the circuit to the source of current when said temperature responsive means is heated, an electrically heated bimetallic blade effective when energized to intercept said second deflectable blade and prevent closing of the circuit through said second contacts, a circuit for heating said bimetallic blade connected to a source of current independently of said deflectable blades and contacts, and a thermostatic switch in the circuit of said bimetallic blade heater responsive to a predetermined low temperature to close said blade heater circuit for heating said bimetallic blade, said bimetallic blade remaining ineffective to intercept said second blade for a predetermined interval after its heating circuit is closed.

WILLIAM A. MARSHALL, Jr.

REFERENCES CITED

The following references are of record in the file of this patent:

UNITED STATES PATENTS

| Number | Name | Date |
| --- | --- | --- |
| 2,159,257 | Danuser | May 23, 1939 |
| 2,162,571 | Bock | June 13, 1939 |
| 2,174,818 | Brace | Oct. 3, 1939 |